(12) United States Patent
Lee et al.

(10) Patent No.: US 6,904,030 B2
(45) Date of Patent: Jun. 7, 2005

(54) PILOT CHANNEL POWER MEASUREMENT MEANS FOR A MOBILE STATION IN ASYNCHRONOUS CDMA COMMUNICATION SYSTEM

(75) Inventors: Kyung-Ha Lee, Seoul (KR); Hee-Sun Cho, Yongin-shi (KR); Sung-Bok Park, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 878 days.

(21) Appl. No.: 09/896,541

(22) Filed: Jun. 29, 2001

(65) Prior Publication Data

US 2003/0002454 A1 Jan. 2, 2003

(51) Int. Cl.$^7$ .............................................. H04B 7/216
(52) U.S. Cl. ..................... 370/335; 370/342; 375/299
(58) Field of Search ................................ 370/252, 318, 370/320, 335, 342; 455/513, 522; 375/137, 149, 299, 356

(56) References Cited

U.S. PATENT DOCUMENTS

| | | | |
|---|---|---|---|
| 5,652,764 A | | 7/1997 | Kanzaki et al. |
| 5,940,432 A | * | 8/1999 | Saito et al. ............... 375/148 |
| 5,982,763 A | * | 11/1999 | Sato ........................ 370/342 |
| 6,081,548 A | * | 6/2000 | Saito ........................ 375/130 |
| 6,118,806 A | * | 9/2000 | Niida et al. ............... 370/342 |
| 6,163,705 A | * | 12/2000 | Miya ........................ 455/522 |
| 6,473,451 B1 | * | 10/2002 | Seki et al. ................. 370/342 |
| 6,590,883 B1 | * | 7/2003 | Kitade et al. ............... 370/337 |
| 6,795,422 B2 | * | 9/2004 | Ohsuge .................... 370/342 |

FOREIGN PATENT DOCUMENTS

WO     WO 99/59254     11/1999

OTHER PUBLICATIONS

European Search Report dated Dec. 5, 2003 issued in a counterpart application, namely, Appln. No. 01115818.5.

* cited by examiner

Primary Examiner—Chau Nguyen
Assistant Examiner—Andy Lee
(74) Attorney, Agent, or Firm—Dilworth & Barrese LLP (57) ABSTRACT

A power measurement means for a mobile station for measuring transmission power of a base station in an asynchronous code division multiple access (CDMA) communication systems using diversity techniques is disclosed. The power measurement means comprises scramble code generators for generating scramble codes which are allotted to each said base station, multipliers for despreading the received pilot channel signals that are spread by the scramble codes, integrators for obtaining amplitudes of the signals by integrating the despread pilot channel signals for each slot period of the pilot symbols, and outputting the amplitudes at the end time of each slot period, squarers for obtaining the power value of the signal by squaring the amplitudes, delay means for delaying the power value one slot period, an adder for adding the power value output from said squarer and the power value provided by said delay means, and switches for connecting to the adder at the end time of every two slots.

11 Claims, 6 Drawing Sheets

Ns: NUMBER OF CHIPS PER SYMBOL
Ts: TIME SLOT PERIOD

PILOT CHANNEL POWER MEASUREMENT MEANS FOR A MOBILE STATION IN ASYNCHRONOUS CDMA COMMUNICATION SYSTEM

BACKGROUND OF THE INVENTION

1. Field of the Invention

The present invention relates generally to a power measurement means of a mobile station for measuring power of pilot channel signals transmitted from base stations in an asynchronous code division multiple access (CDMA) communication system. More particularly, the present invention relates to a power measurement means of a mobile station for measuring transmission power of each base station using transmission diversity techniques when the mobile station receives pilot channel signals combined with a plurality of spread pilot channel signals that are separately transmitted through antennas of each base station after pilot channel symbols are spread by a scramble code which is allotted for each base station, and a plurality of antenna symbol patterns.

2. Description of the Related Art

A variety of multiple access communication systems have used a single antenna for data transmission between base stations and mobile stations. In these cases, there has developed a critical problem concerning the deterioration of quality of the communication causing damage to several data groups if transmission channels encounter fading. The recited problem has been solved by the use of transmission diversity techniques in which data or information are transferred through at least two antennas. That is, the communication quality of mobile communication systems due to the deleterious effects of fading may have been improved by diversity techniques. In third generation mobile communication systems, transmission diversity techniques whereby base stations transmit the same data through two antennas has been recommended to maximize the capability of data transmission and receiving.

Third generation mobile communication systems suggested by Europe entities (hereinafter, called 3GPP) have also requested that base stations use diversity techniques to maximize the capability of data transmission/receiving. However, a mobile station can not use diversity techniques since it is physically too small to incorporate two antennas. In other words, even if the mobile station incorporates two antennas, the gain of diversity is too small because the distance between the two antennas is too short. Other disadvantages of a mobile station using diversity techniques are the size and manufacturing cost of the mobile station. In view of the above problems, generally base stations have only been able to use diversity techniques.

Figure 1:
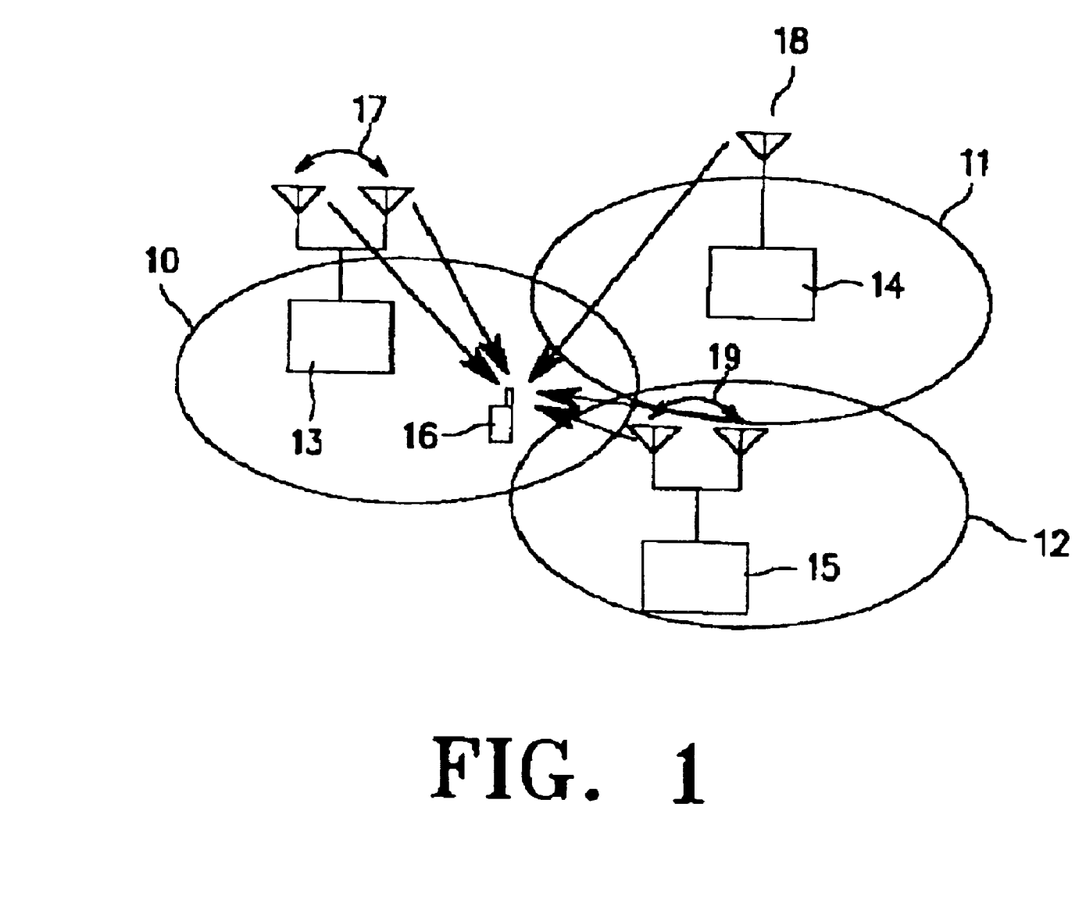
FIG. 1 illustrates a mobile communication system wherein a base station using transmission diversity techniques transmits signals to mobile stations.

FIG. 1 shows a mobile communication system in which a mobile station 16 receives signals transmitted from base stations through antennas in the radio mobile communication system. As shown in FIG. 1, the mobile station 16 may receive signals transmitted from not only base station 13 in the cell 10 in which the mobile station exists, but also from neighboring base stations 14, 15 in cells 11 and 12, respectively. Generally, the signal strength transmitted from the neighboring base stations is weaker than that of base station 13 in the cell 10 in which the mobile station 16 exists. However, as the mobile station approaches the border of the neighboring base stations 14, 15 in cells 11 and 12, the weaker the signal strength transmitted from base station 13 in the cell 10 where the mobile station exists, the stronger the signal strength transmitted from the neighboring base stations. Therefore, the mobile station 16 must frequently measure the power of pilot signals transmitted from not only base station 13 where the mobile station is located, but also the neighboring base stations 14, 15, in order to determine the time to perform hand-over.

Figure 2:
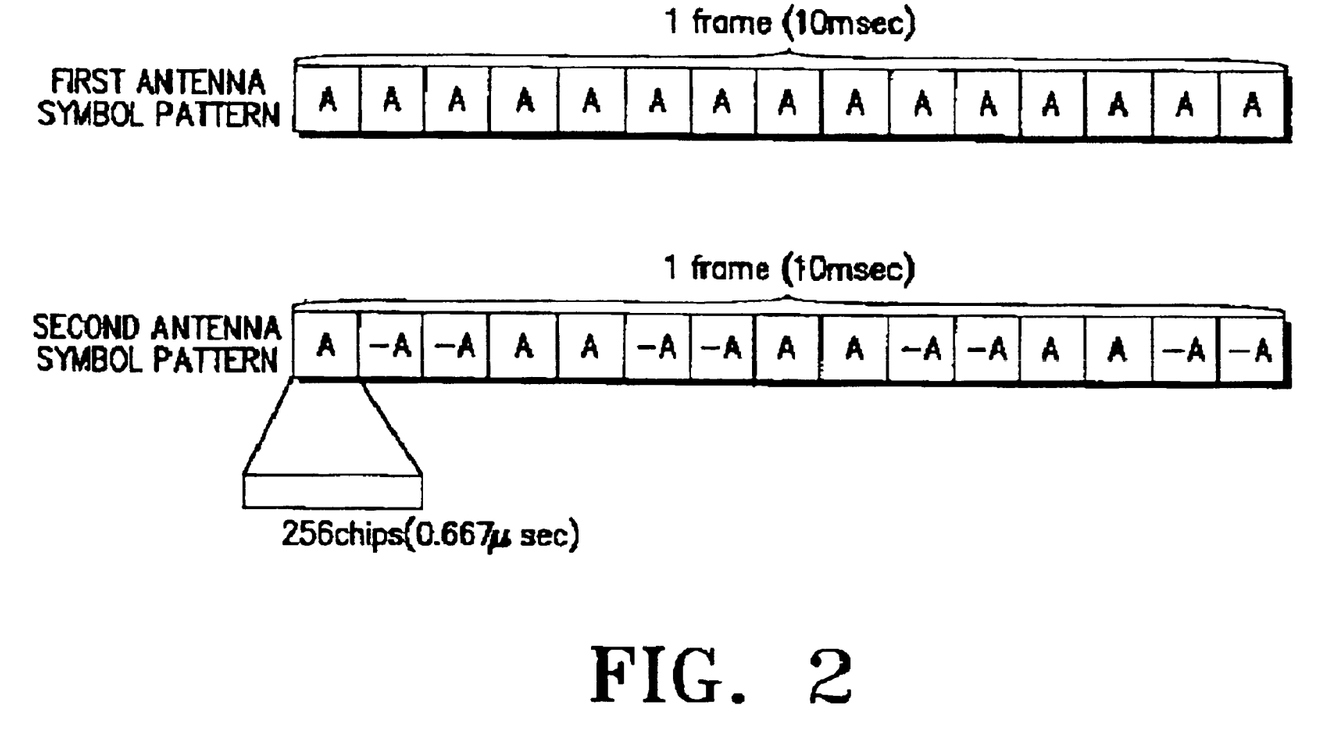
FIG. 2 illustrates the structure of antenna symbol patterns to discriminate between two antennas.

FIG. 2 illustrates the structure of antenna symbol patterns for discriminating antennas when a base station transmits the same pilot channel signals through two antennas. According to the specification of 3GPP, a frame of a physical channel consists of a plurality of time slots (e.g., 15 time slots) and has a specific time duration (e.g., 10 msec). Data of each time slot of the frame is spread over a plurality of chips (e.g., 256 chips) by a scramble code generated in a scramble code generator (not shown). Each pilot symbol is also spread over 256 chips by the scramble code. The spread 256 chips per antenna symbol are spread over a pilot channel signal by an antenna pattern symbol. The first antenna symbol pattern is composed of 15 time slots whose sign are all the same, while the second antenna symbol is composed of 15 time slots where two slots of each pair of slots has an opposite sign. In other words, slots 2, 3, 6, 7, 10, 11, 14 and 15 of the frame have an opposite sign comparing to the rest of the slots of the frame.

Figure 3:
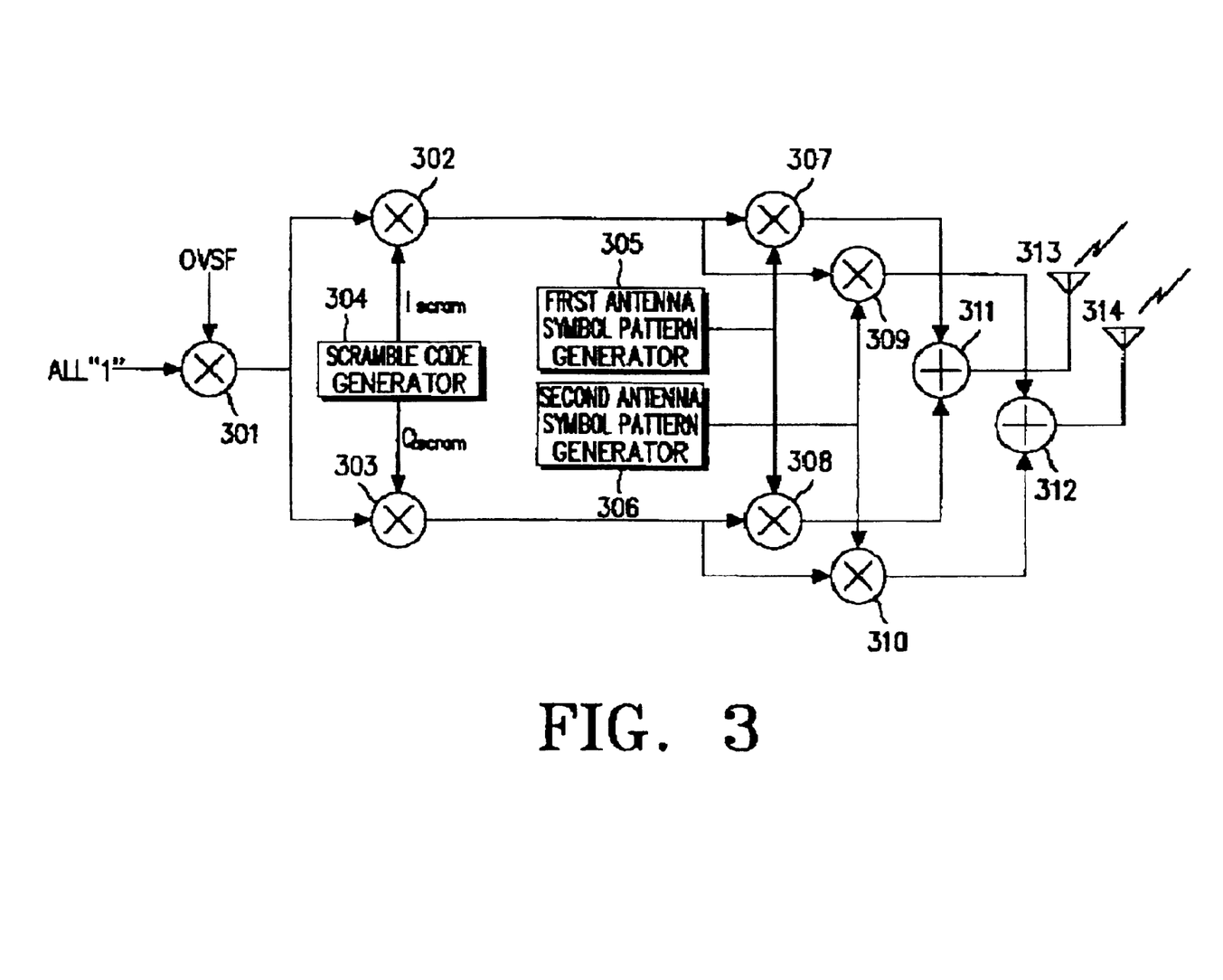
FIG. 3 illustrates a block diagram showing the prior art generation of and the transmission of the pilot channel signals through two antennas from a base station.

FIG. 3 illustrates that a base station using diversity techniques simultaneously transmits pilot channel signals spread by the antenna symbol pattern of FIG. 2 through two antennas. Referring to FIG. 3, unmodulated pilot symbols consisting of all 1's are spread by Orthogonal Variable Spreading Factor Code (OVSF code) in multiplier 301. The spread pilot symbols output from the multiplier 301 are spread over 256 chips per symbol by I/Q scramble codes generated by the scramble code generator 304 in multipliers 302 and 303. The I/Q scramble codes are a digital data sequence allotted for each base station. Each spread I/Q signal output from multipliers 302 and 303 is spread over the first pilot channel signal by multiplexing the first antenna symbol pattern provided by the first antenna symbol pattern generator 305 in multipliers 307 and 308, respectively. The spread I/Q signals output from each multipliers 302 and 303 are also spread over the second pilot channel signal by multiplexing the second antenna symbol pattern provided by the second antenna symbol pattern generator 308 in multipliers 309 and 310, respectively. The first pilot channel signal corresponding to the spread I/Q signals spread by the first antenna symbol pattern is combined in an adder 311, and is transmitted through the first antenna 313 after frequency modulating in a modulator (not shown). The second pilot channel signal corresponding to the spread I/Q signals spread by the second antenna symbol pattern is combined in a second adder 312, and is transmitted through the second antenna 314 after being frequency modulated in a modulator (not shown).

As described in the above, base stations simultaneously transmit the spread pilot channel signals spread respectively by two antenna symbol patterns through two antennas. Therefore, when a mobile station measures the power of pilot channel signals by using the method of IS-95, the mobile station must separate the received pilot channel signals into the first and second pilot channel signal. This is because the pilot channel signals received by the mobile station consist of the first pilot channel signal spread by the first antenna symbol pattern, and the second pilot channel signal spread by the second antenna symbol pattern. The mobile station accumulates the received pilot channel signals for at least a two-slot period in order to separate the first and second pilot channel signals. When measuring the power of the first pilot channel signal transmitted from the first antenna of a base station, a mobile station despreads the received pilot channel signal by every two slots of a frame, such as pair of slots —AA—of the first antenna symbol pattern in FIG. 2 so that the mobile station can eliminate the second pilot channel signal which is transmitted from the second antenna of a base station among the received pilot channel signals having the first and second pilot channel signals combined. This method, however, does not measure the power of the second pilot channel signal transmitted from the second antenna of the base station. Thus, even though the second antenna of the base station transmits the pilot channel signal having a higher power than the first antenna, the mobile station may make an wrong handoff decision based upon power of the first pilot channel signal transmitted from the first antenna.

Figure 5:
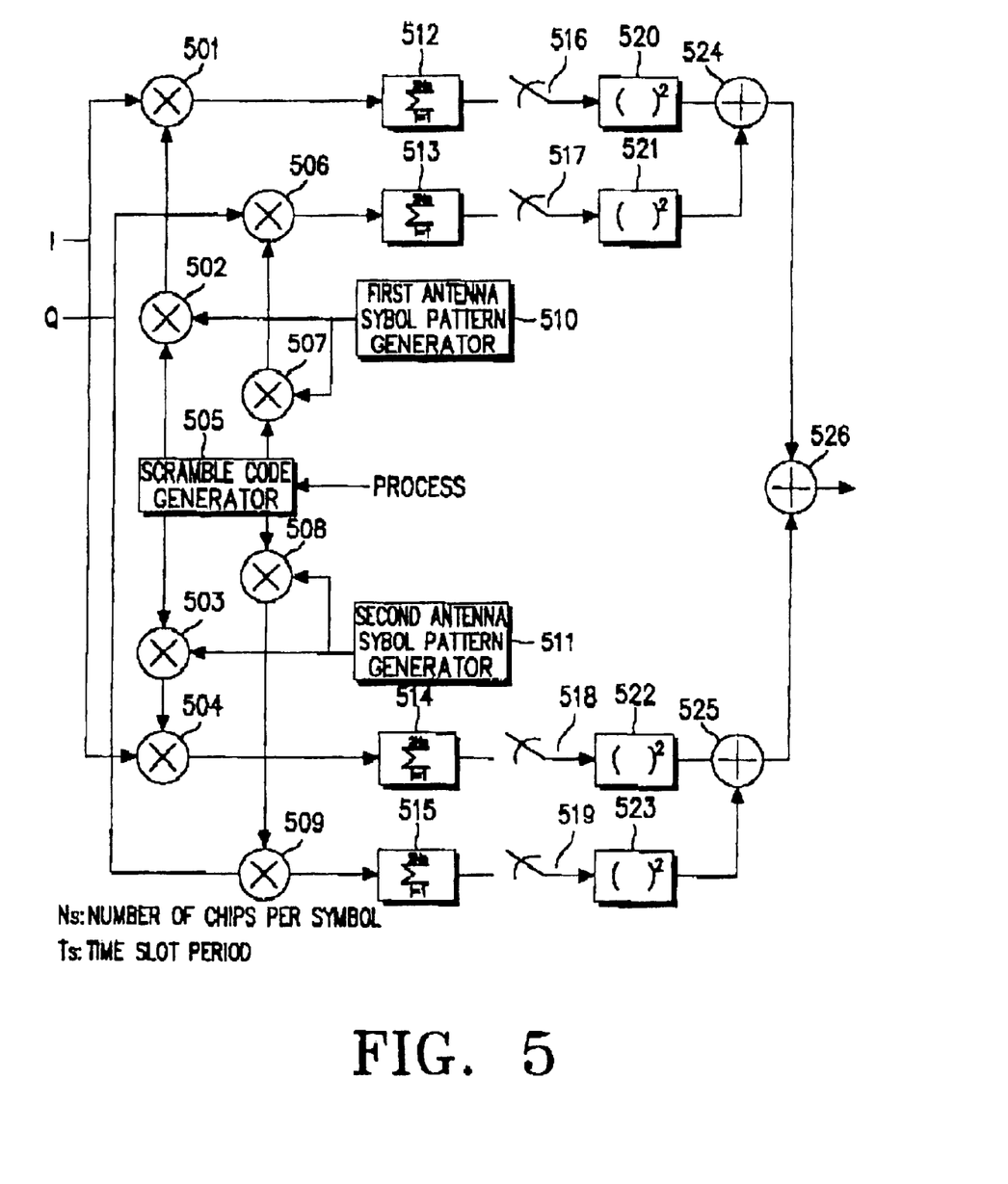
FIG. 5 illustrates a block diagram showing the structure of a power measurement means of the prior art.

As illustrated in FIG. 5, after receiving pilot channel signals which combine the first and second pilot channel signals that are spread in a base station, a mobile station may separate the first and second pilot channel signals from the received pilot channel signals by multiplying the first or second antenna symbol patterns and the received pilot channel signals. The I/Q pilot channel signals received by the mobile station are despread in multipliers 501 and 506 by signals generated in multipliers 502 and 507, in order to separate the first pilot channel signal from the despread pilot channel signals. The signals generated in multipliers 502 and 507 are obtained by multiplexing a scramble code generated in the scramble code generator 505 and the first antenna symbol pattern, which is generated in the first antenna symbol pattern generator 510 of the mobile station. The received I/Q pilot channel signals are also despread in multipliers 504 and 509 by signals generated in multipliers 503 and 508, in order to separate the second pilot channel signal from the despread pilot channel signals. The signals generated in multipliers 503 and 508 are obtained by multiplexing a scramble code generated in the scramble code generator 505, and the second antenna symbol pattern, which is generated in the second antenna symbol pattern generator 511 of the mobile station. Using the above method, the pilot channel signals received by the mobile terminal through an antenna are separated into the first and second pilot channel signals, respectively. Each separated first and second pilot channel signal is integrated at integrators 512, 513, 514, 515 at every two slots. The integrated value output from the integrators is multiplied at squarers 520, 521, 522, 523, and are exclusively combined at exclusive combiners 524, 525, respectively. That is, the power of each pilot channel signal transmitted from the two antennas of a base station is obtained. As a result, the power of each of the pilot channel signals of the two antennas are combined in an adder 526, and thus the mobile station may measure the whole power of the pilot channel signals of the base station regardless of the ratio of receiving power of each antenna at every two slots. This method, however, should have the received pilot channel signals separated into the first and second pilot channel signals since the received pilot channel signals received through the antenna of the mobile terminal are the combined first and second pilot channel signals. Consequently, these steps, such as generating two antennas symbol patterns and despreading the received signals, make the hardware structure of the mobile station very complicated. The integrators 512, 513, 514 and 515 must integrate 512 chips (that is, two times 256 chips), which corresponds to one symbol period, so that this limitation in designing circuits results in negative effects in power measurement in conditions such as fading, frequency error, or so on.

SUMMARY OF THE INVENTION

It is therefore an object of the present invention to provide a power measurement means for a mobile station for measuring the power of pilot channel signals which are transmitted by a base station in an asynchronous code division multiple access (CDMA) communication system.

It is another object of the present invention to provide a power measurement means for mobile stations, which receive pilot channel signals consisting of a plurality of pilot channel signals, for measuring transmitting power of each base station using diversity techniques.

It is still another object of the present invention to provide a means for determining whether a base station uses diversity techniques or not.

According to an aspect of the present invention, there is provided a power measurement means for a mobile terminal in an asynchronous code division multiple access (CDMA) communication system. A base station spreads pilot channel symbols over scramble code which is allotted for the base station, and the spread pilot symbols are spread over a plurality of pilot channel signals by a plurality of antenna symbol patterns. The base station transmits the plurality of pilot channel signals through a plurality of antennas respectively, wherein at least one pilot channel signal is spread over the first antenna symbol pattern, which is a frame consisting of a plurality of slots whose signs are all the same, and at least one other pilot channel signal is spread over another antenna symbol pattern, which is a frame consisting of a plurality of slots in which two slots of each pair of slots have an opposite sign from each other. When a mobile station receives pilot channel signals consisting of a plurality of pilot channel signals which are spread, the power measurement means for measuring transmission power of each base station comprises: a scramble code generator for generating scramble code which is allotted to said base station; a multiplier for despreading the received pilot channel signal that is spread by the scramble code; an integrator for obtaining the amplitude of the signal by integrating the despread pilot channel signal for each slot period of the pilot symbols, and outputting the amplitude at an end time of each slot period; a squarer for obtaining the power value of the signal by squaring the amplitude; a delayer for delaying the power value one slot period; and an adder for adding the power value output from said squarer and the power value provided by said delayer.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

A preferred embodiment of the present invention will be described in detail hereinbelow with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 6:
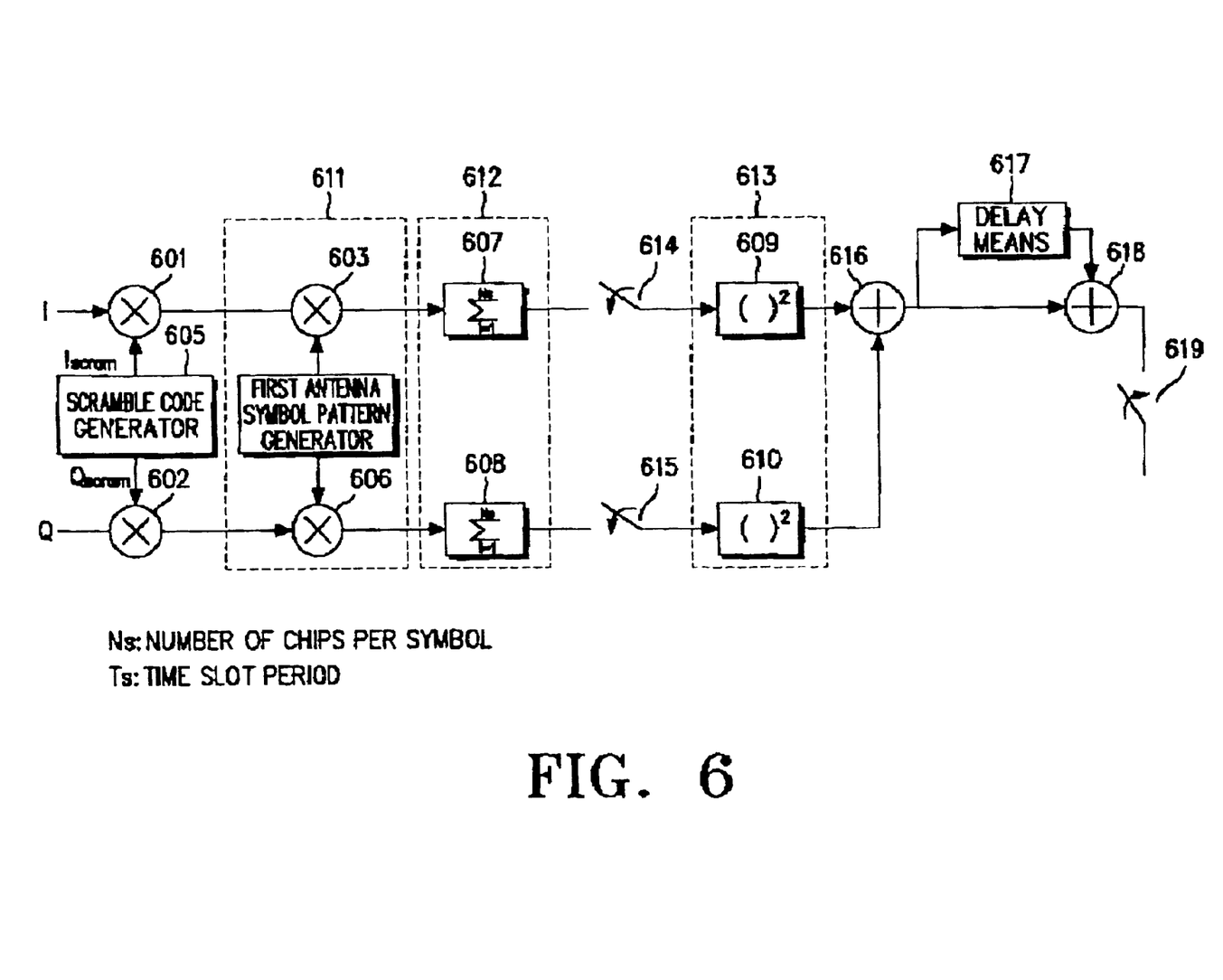
FIG. 6 illustrates a block diagram showing the structure of a power measurement means according to the present invention.

FIG. 6 illustrates the structure of a power measurement means for measuring the power of pilot channel signals according to a preferred embodiment of the present invention. The power measurement means of FIG. 6 is included in each digital data receiver 404, 405 and 406 of FIG. 4.

Figure 4:
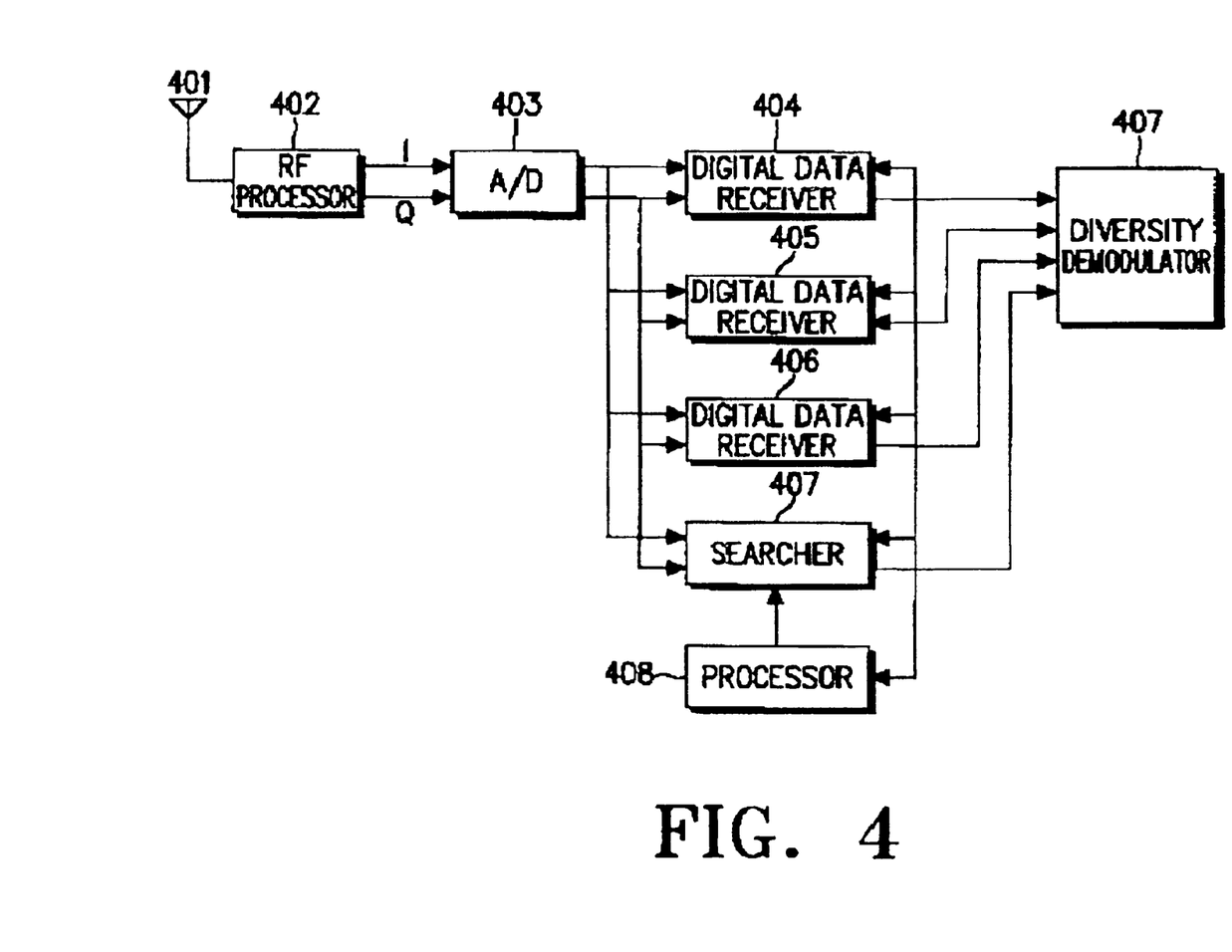
FIG. 4 illustrates a block diagram showing the structure of a mobile station in a code division multiple access (CDMA) communication systems.

Referring FIGS. 4 and 6, a mobile station receives pilot channel signals consisting of the first and second pilot channel signal through an antenna 401. The received pilot channel signals are converted into an I/Q digital signal through an RF processor 402 and A/D converter 403 as seen in FIG. 4. The converted I/Q signals are provided to digital data receivers 404, 405, 406 and searcher 407, respectively. The spreading of the I/Q signals are implemented in each digital data receivers whose structure are described in FIG. 6. As shown in FIG. 6, the I/Q signals is spread by an I/Q scramble code, which is generated by a scramble code generator 605, in multipliers 601 and 602. After being spread in multipliers 603 and 604 of element 611 by the first antenna symbol pattern generated by the first antenna symbol generator 606, each spread I/Q signal from multipliers 601 and 602 are provided to integrators 607 and 608. The integrator 607 and 608 of integrator 612 integrate the despread I/Q signals by 256 chips for each time slot period corresponding to each pilot symbol, and then output the I/Q signals representing the amplitude of the pilot channel signals. The I/Q signals output from the integrators 607, 608 are provided to squarer 609 and 610 of squarer 613 through switches 614 and 615, respectively, which are connected at the end time of each time slot period. In order to obtain the power of the pilot channel signals for each time slot period, the amplitudes of the signals provided by the integrators 607, 608 are multiplied by the squarer 609 and 610 of squarer 613 and are added by an adder 616. The power value of the pilot channel signals for one time slot period, which is output from the adder 616, is delayed by next time slot in delay means 617. The adder 618 adds the power value of the pilot channel signals of the next time slot period being provided by the adder 616, and the power value which is delayed for one time slot and inputted by the delay means 617. The signal or information which represents the power value of a two time slot period is provided by the adder (616) is provided to a processor (not shown) by the switch (619), which is connected at the end of every two time slot, and then transmits to base stations. That is, any person skilled in the art easily understands that information output from the exclusive adder (618) corresponds to the combination of two power values of each pilot channel signal, which is transmitted separately from two antennas of a base station, through two time slots.

Furthermore, those skilled in the art will also understand that the present invention may be accomplished without the first antenna symbol pattern generator 606 and multipliers 603, 604.

According to a preferred embodiment of the present invention, the measuring steps of a mobile station for measuring power of pilot channel signals transmitted from two antennas of a base station will now be explained.

Assuming that the total pilot power value transmitted from the two antennas of a base station is 1, the power ratio of each pilot channel signal received by a mobile station may be described by 1−x:x. The power value of x, thus, may range between 0 and 1. What x=0, a base station transmits signals over only one antenna or does not use diversity techniques.

A mobile station receives pilot channel signals consisting of the first and second channel signals through its antennas. The received pilot channel signals are separated into I/Q signals, and despread into 256 chips by a scramble code in multipliers 601, 602 of FIG. 6. The despread I/Q signals are integrated in integrator 612 for each time slot period to obtain the amplitude of the pilot channel signals. Generally, since P (Power) $\propto A^2$ (Amplitude) and the pilot channel signals consist of the first and second pilot channel signals, the amplitude value of signal which corresponds to the 1, 4, 5, 8, 9, 12 and 13 time slot periods of a frame is described as $\sqrt{1-x}+\sqrt{x}$. The amplitude of signal of each of the 2, 3, 6, 7, 10, 11 and $14^{th}$ time slot period is $\sqrt{1-x}-\sqrt{x}$ since the second pilot channel signal has an opposite sign over the above time slots. Generally, since the amplitude of $15^{th}$ time slot period is not used the 256 chips corresponding to $15^{th}$ time slot of the frame may not be despread. The squarer 613 squares the amplitude provided by the integrator 612 in order to obtain power of the pilot channel signals. The value representing power of each of the 1, 4, 5, 8, 9, 12 and $13^{th}$ slot, thus, corresponds $1+2\sqrt{x(1-x)}$, and the value representing power of each of the 2, 3, 6, 7, 10, 11, 14 and $15^{th}$ slot corresponds $1-2\sqrt{x(1-x)}$. Therefore, the combined value of the two power values output from each squarer 609 and 610 of squarer 613 and delay means 617 is equal to 2, namely $1+2\sqrt{x(1-x)}+1-2\sqrt{x(1-x)}=2$. As a result, the mobile station measures power of each first and second pilot channel signal regardless of the power ratio transmitted from the two antennas of a base station. Therefore, the mobile station measures the total power of any base station regardless of the transmission form of any base station or power ratio of the two antennas received by the mobile terminal.

The above description of the preferred embodiment is provided to enable any person skilled in the art to make or use the present invention. Various modifications to the preferred embodiments will be readily apparent to those skilled in the art, and the generic principles defined herein may be applied to other embodiments. For example, the first antenna symbol pattern generator may replace the second antenna symbol pattern generator. In addition, the location of the scramble code generator and antenna symbol pattern generator to spread the received pilot channel signals may be changed.

Furthermore, even though the number of antenna symbol patterns are over 3, a mobile terminal may measure the total power of any base station by using the means of the present invention. Thus, the present invention is not intended to be limited to the embodiment shown but is to be defined by the scope and spirit of the appended claims.

What is claimed is:

1. In an asynchronous code division multiple access (CDMA) communication system using diversity techniques, a power measurement means for a mobile station for measuring transmission power of a base station comprising:

a scramble code generator for generating a scramble code which are allotted to the base station;

a multiplier for despreading received pilot signal that is spread by the scramble code;

an integrator for obtaining amplitudes of the pilot signals by integrating the despread pilot signals for each slot period of pilot symbols, and outputting each amplitude at an end time of each slot period;

a squarer for obtaining power values of the pilot signals by squaring each amplitude;

a delay means for delaying the power value one slot period; and an adder for adding the power values output from said squarer and the power value provided by said delay means.

2. In an asynchronous code division multiple access (CDMA) communication system, in which each base station spreads pilot channel symbols with antenna symbol patterns and scramble code which is allotted for each base station, and where each base station transmits the spread of pilot channel signals through respective antennas, wherein at least one pilot channel signal comprising a frame consisting of a plurality of slots whose signs are all the same is spread by a first antenna symbol pattern, and at least one other pilot channel signal comprising a frame consisting of a plurality of slots whose two slots of each pair of slots have a opposite sign from each other is spread by a second antenna symbol pattern, when a mobile station receives pilot channel signals, a power measurement means for measuring transmission power of the base stations comprising:

a scramble code generator for generating scramble code which is allotted to a base station;

a multiplier for despreading the received pilot channel signal that is spread by the scramble code;

an integrator for obtaining amplitudes of the pilot channel signal by integrating the despread pilot channel signal for each slot period of the pilot symbols, and outputting the amplitudes at an end time of each slot period;

a squarer for obtaining power values of the pilot channel signals by squaring the amplitudes;

a delay means for delaying the power value for one slot period; and an adder for adding the power value output from said squarer and the power value provided by said delay means; and a switch for connecting to said adder at an end time of every two slots.

3. The power measurement means of claim 2, further comprising a switch located between said integrator and squarer, for connecting at an end time of one slot.

4. The power measurement means of claim 2, further comprising antenna symbol pattern generator located between said scramble code generator and said integrator, for generating the antenna symbol pattern.

5. The power measurement means of claim 2, wherein said pilot channel symbol is spread over 256 chips by the scramble code.

6. The power measurement means of claim 2, wherein said integrator accumulate 256 chips of the despread pilot channel signal.

7. The power measurement means of claim 2, wherein said antenna symbol pattern is a frame consisting of 15 slots.

8. The power measurement means of claim 2, wherein first antenna symbol pattern is a frame consisting of 15 slots whose slots all have the same sign, and second antenna symbol pattern is a frame consisting of 15 slots whose 2, 3, 6, 7, 10, 11, 14, $15^{th}$ slots have opposite signs from the remaining slots.

9. The power measurement means of claim 2, wherein $15^{th}$ slot of the frame of said pilot channel signal is not spread.

10. In an asynchronous code division multiple access (CDMA) communication systems, in which base station spread pilot symbols over scramble code which is allotted for a base station and transmit first and second pilot channel signals in which the spread pilot symbols are respectively spread by a first and second antenna symbol pattern through at least two antenna, wherein the first antenna symbol pattern is a frame consisting of 15 slots whose signs are the same, and the second antenna symbol pattern is a frame consisting of 15 slots in which two slots of each pair of slots has an opposite sign from each other, a power measurement means for a mobile station for measuring the transmission power of each base station when an antenna of the mobile station receives the pilot channel signals comprising:

a scramble code generator for generating the scramble code which is allotted for said base station;

a multiplier for despreading the received pilot channel signals which are spread by the scramble code;

a integrator for obtaining amplitudes of despread pilot channel signals by integrating the despread pilot channel signals for each period of slots and outputting the obtained amplitudes at the moment of each slot period end;

squarer means for obtaining a power values of the despread signal by squaring each of the amplitudes;

a delay means for delaying the power values input from said squarer means for one slot period;

an adder for adding the power value output from said squarer means and the power value from said delay means; and switching means for switching to said adder at the moment every two slot period ends.

11. In an asynchronous code division multiple access (CDMA) communication system including base station utilizing diversity technique, said base station spreading pilot channel signals by a scrambling code and antenna symbol patterns in which at least one antenna symbol pattern has all the same signs and another antenna symbol pattern consists of a plurality of pairs of symbols which have opposite signs from each other, and said base station transmit the spread pilot channel signals through respective antennas, a power measurement means in a mobile station for measuring power of the base station by using the pilot channel signals, comprising:

scramble code generator for generating the scramble code which is allotted for the base station;

multiplier for despreading the received pilot channel signals into I/Q pilot channel signals by multiplying the pilot channel signals and the scramble codes;

integrators for integrating the despread I/Q pilot channel signals for each period of slots corresponding to each pilot symbol, and outputting obtained amplitudes at the moment each slot period ends;

squarer means for squaring the integrated value of the I/Q signal inputted from said integrators;

delay means for delaying the power value input from said squarer means for one slot period;

an adder for adding the power value which is output from said square means and the power value which is provided by said delay means; and switching means for switching to said adder at the moment every two slot periods ends.

* * * * *